United States Patent
Yang et al.

(10) Patent No.: US 10,111,112 B2
(45) Date of Patent: Oct. 23, 2018

(54) METHOD AND DEVICE FOR REPORTING CHANNEL STATE INFORMATION

(71) Applicant: Samsung Electronics Co., Ltd, Gyeonggi-do (KR)

(72) Inventors: Yunchuan Yang, Beijing (CN); Yingyang Li, Beijing (CN); Jingxing Fu, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 44 days.

(21) Appl. No.: 15/106,801

(22) PCT Filed: Dec. 22, 2014

(86) PCT No.: PCT/KR2014/012627
§ 371 (c)(1),
(2) Date: Jun. 20, 2016

(87) PCT Pub. No.: WO2015/093910
PCT Pub. Date: Jun. 25, 2015

(65) Prior Publication Data
US 2016/0337874 A1 Nov. 17, 2016

(30) Foreign Application Priority Data
Dec. 20, 2013 (CN) .......................... 2013 1 0713573

(51) Int. Cl.
*H04W 24/02* (2009.01)
*H04B 17/24* (2015.01)
(Continued)

(52) U.S. Cl.
CPC .............. *H04W 24/02* (2013.01); *H04B 7/04* (2013.01); *H04B 7/0469* (2013.01);
(Continued)

(58) Field of Classification Search
CPC ......... H04W 24/02; H04B 17/24; H04B 7/04; H04B 7/0469
See application file for complete search history.

(56) References Cited

U.S. PATENT DOCUMENTS

2011/0244877 A1 10/2011 Farajidana et al.
2013/0039199 A1* 2/2013 Liao ..................... H04W 72/085
370/252
(Continued)

FOREIGN PATENT DOCUMENTS

CN 102549963 A 7/2012
CN 102938688 A 2/2013
(Continued)

OTHER PUBLICATIONS

International Search Report dated Mar. 10, 2015 in connection with International Patent Application No. PCT/KR2014/012627, 3 pages.
(Continued)

*Primary Examiner* — Siming Liu (57) ABSTRACT

The present invention discloses a method for reporting channel state information, comprising the following steps of: acquiring, by UE, information about at least two sets of CSI RSs, wherein the information about CSI RSs comprises time domain resource and frequency domain resource occupied by CSI RSs; and measuring, by the UE, a reference signal according to the information about at least two sets of CSI RSs, determining channel state information, and reporting the channel state information to a base station. Another aspect of the present invention further provides a device for reporting channel state information. By the technical solutions provided by the present invention, after pre-coding the CSI RSs, the system performance can be improved, and the resources occupied by the CSI RSs may be greatly saved in practical applications, so that more downlink physical resources may be used for transmission of physical down-
(Continued)

link shared channels (PDSCH), thereby increasing the throughput of downlink traffic.

20 Claims, 6 Drawing Sheets

(51) Int. Cl.
*H04B 7/0456* (2017.01)
*H04L 5/00* (2006.01)
*H04B 7/04* (2017.01)
*H04W 24/10* (2009.01)
*H04W 72/04* (2009.01)
*H04W 72/12* (2009.01)
*H04B 7/06* (2006.01)

(52) U.S. Cl.
CPC .......... *H04B 7/0478* (2013.01); *H04B 7/065* (2013.01); *H04B 17/24* (2015.01); *H04L 5/0007* (2013.01); *H04L 5/0048* (2013.01); *H04W 24/10* (2013.01); *H04W 72/042* (2013.01); *H04W 72/0446* (2013.01); *H04W 72/0453* (2013.01); *H04W 72/1226* (2013.01); *H04B 7/0639* (2013.01)

(56) References Cited

U.S. PATENT DOCUMENTS

| 2013/0121246 | A1 | 5/2013 | Guey et al. |
| 2013/0258964 | A1* | 10/2013 | Nam .................. H04W 72/046 370/329 |
| 2013/0286884 | A1 | 10/2013 | Li et al. |
| 2013/0343216 | A1 | 12/2013 | Su et al. |
| 2014/0192762 | A1 | 7/2014 | Li et al. |

FOREIGN PATENT DOCUMENTS

| EP | 2645616 A2 | 10/2013 |
| KR | 10-2013-0122646 | 11/2013 |

OTHER PUBLICATIONS

Written Opinion of the International Searching Authority dated Mar. 10, 2015 in connection with International Patent Application No. PCT/KR2014/012627, 6 pages.

Communication from a foreign patent office in a counterpart foreign application, SIPO, "The First Office Action," Application No. CN 201310713573.4, dated Aug. 29, 2018, 13 pages.

Alcatel-Lucent, et al., "Considerations on CSI feedback enhancements for high-priority antenna configurations," R1-112420, 3GPP TSG-RAN WG1 #66, Athens, Greece, Aug. 22-26, 2011, 7 pages.

* cited by examiner

S610: Acquire, by UE, information about at least two sets of CSI RSs, whrerin the information about CSI RSs comprises time domain resource and frequency domain resource occupied by CSI RSs

↓

S620: Measure, by the UE, a reference signal according to the information about at least two sets of CSI RSs, determine channel state information, and report the channel state information to a base station

METHOD AND DEVICE FOR REPORTING CHANNEL STATE INFORMATION

TECHNICAL FIELD

The present invention relates to the wireless communication technology, and particularly to a method and device for reporting channel state information in a multi-antenna wireless communication system.

BACKGROUND ART

Figure 1:
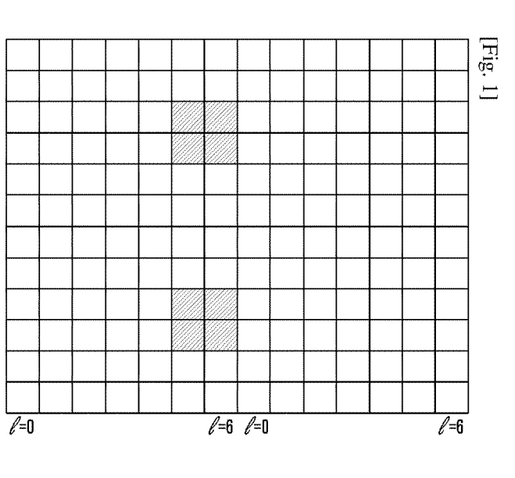
FIG. 1 is a structure diagram of CSI RS physical resource in each PRB.

In a long term evolution advanced (LTF-A) system, to increase the throughput of a cell and reduce the interference between users, each cell may be configured with 16, 32, 64 or more transmitting antennae for beam forming. A base station configures a channel state information reference signal (CSI RS) for each user equipment (UE), and the UE measures channel state information (CSI) of a channel using the channel state information reference signal (CSI RS) and then feeds back the channel state information to the base station. As a CSI RS, previous to 3GPP Version 12, is designed according to the actual number of physical antennae, and there are eight ports at most in the CSI RS previous to 3GPP Version 12, and there are eight resource units at most in each physical resource block, as shown in FIG. 1. At present, the number of physical antennae increases greatly. If the number of ports is designed still according to the number of the physical antennae, the resources occupied by CSI RSs in each resource block will increase greatly. How to reduce resources occupied by CSI RSs becomes a problem to be researched.

Figure 2:
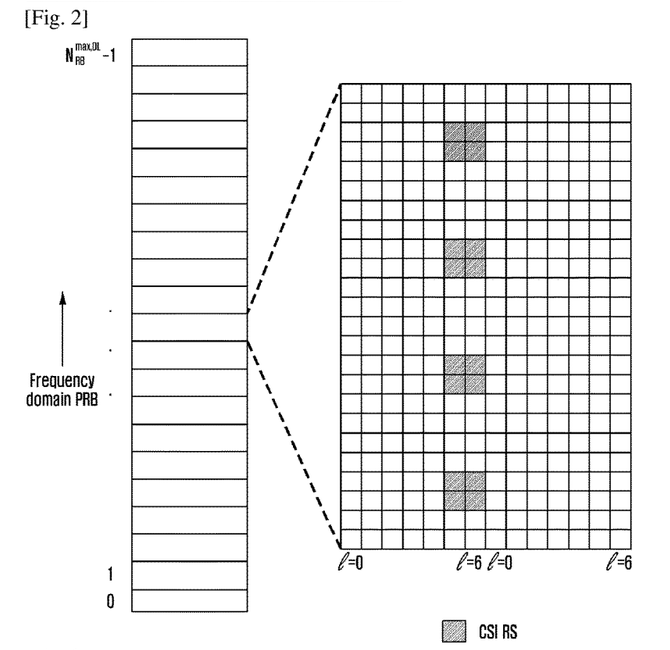
FIG. 2 is a structure diagram of CSI RS physical resource in the system bandwidth.

In the LTF-A system, the resources of CSI RSs are provided for UE to measure channel state information. The channel state information includes a rank indicator (RI), a channel quality indicator (CQI) and a pre-coding matrix indicator (PMI), etc. At present, the CSI RS is sent from a base station to UE, and a corresponding CSI RS original signal is directly transmitted in the bandwidth of the whole downlink system, as shown in FIG. 2. The UE acquires the RI, CQI and PMI by measuring the CSI RSs. Specifically, the method for measuring the CQI is as follows: channel information is measured and estimated through CSI RSs, and then it is assumed that a specific PMI and RI is used at a signal transmitting terminal to measure the corresponding CQI, that is, the measurement of the CQI is performed based on a specific PMI.

Figure 3:
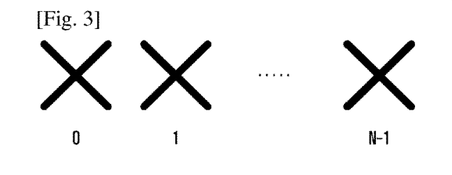
FIG. 3 is a distribution diagram of antennae in a horizontal antenna subarray.
Figure 4:
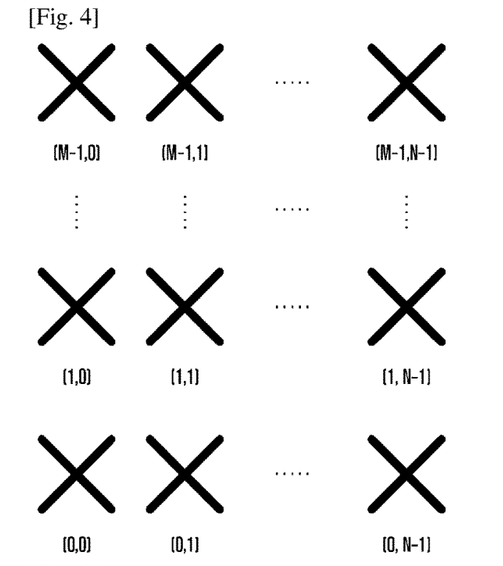
FIG. 4 is a distribution diagram of antennae in a two-dimensional antenna subarray.
Figure 5:
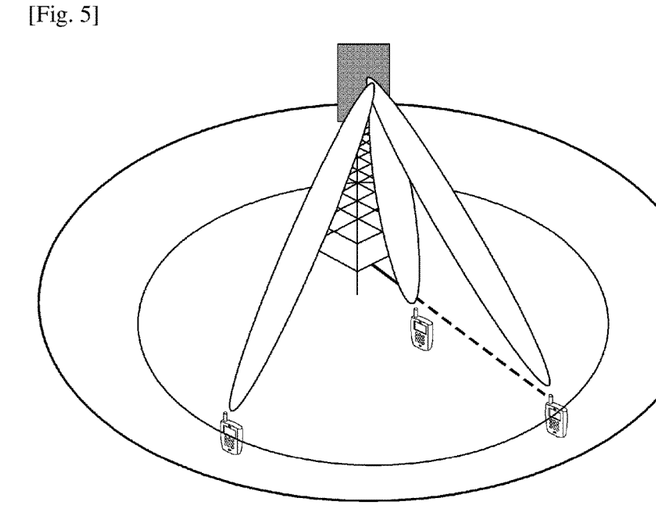
FIG. 5 is a distribution diagram of directions of beams generated by a two-dimensional antenna subarray.

In the LTF-A system, as shown in FIG. 3, antennae are distributed horizontally, and the ports of the antennae are also arranged horizontally. By using a one-dimensional antenna array, beam forming is directed to different direction angles of the horizontal plane. However, in fact, terminals may have different direction angles in the vertical plane due to different locations in the vertical direction and different distances away from a base station. As shown in FIG. 4, by using a two-dimensional antenna array, by beam forming in the vertical plane and beam forming in the horizontal plane, both the interference between terminals at different vertical direction angles and the interference between terminals at different horizontal direction angles are further reduced, thereby further increasing the throughout of a cell, as shown in FIG. 5.

DISCLOSURE OF INVENTION

Technical Problem

When the number of antennae of a system increases sharply, the required CSI RS resources will also increase sharply. Therefore, it is necessary to provide effective technical solutions to solve the problems in use of CSI RS resources.

Solution to Problem

An object of the present invention is to solve at least one of the above technical defects, and particularly to improve system performance after pre-coding CSI RSs. On this account, a major object of the present invention is to provide a solution for reporting channel state information in a multi-antenna wireless communication system thus to optimize the system performance.

To achieve the above object, one aspect of the present invention provides a method for reporting channel state information, including the following steps of:

acquiring, by UE, information about at least two sets of CSI RSs, wherein the information about CSI RSs includes time domain resource and frequency domain resource occupied by CSI RSs; and measuring, by the UE, a reference signal according to the information about at least two sets of CSI RSs, determining channel state information, and reporting the channel state information to a base station.

Another aspect of the present invention further provides a device for reporting channel state information, including:

a receiving module, configured to acquire information about at least two sets of CSI RSs, wherein the information about CSI RSs includes time domain resource and frequency domain resource occupied by CSI RSs;

a measurement module, configured to measure a reference signal according to the information about at least two sets of CSI RSs and determine channel state information; and a sending module, configured to report the channel state information to a base station.

Advantageous Effects of Invention

By the technical solutions provided by the present invention, after pre-coding the CSI RSs, the system performance can be improved, and the resources occupied by the CSI RSs may be greatly saved in practical applications, so that more downlink physical resources may be used for transmission of physical downlink shared channels (PDSCH), thereby increasing the throughput of downlink traffic. Moreover, by the technical solutions provided by the present invention, few changes are required to be done to an existing system, so that the compatibility of the system will not be influenced and the implementation is both simple and efficient.

Additional aspects and advantages of the present invention will be given in the following descriptions. These aspects and advantages will become apparent from the following descriptions or be appreciated from the practices of the present invention.

BRIEF DESCRIPTION OF DRAWINGS

These and/or further aspects and advantages of the present invention will become apparent from and be more readily appreciated from the following descriptions of embodiments taken with reference to the drawings. In the drawings.

MODE FOR THE INVENTION

Embodiments of the present invention shall be described in detail hereafter. The examples of the embodiments shall be illustrated by the accompanying drawings, wherein similar or same numeral symbols indicate similar or same elements or elements with same or similar functions. The embodiments described with reference to the drawings are intended to explain the present invention and should not be construed as limitation to the present invention.

It shall be understood by the skilled in the art that the singular forms "a", "an", "the", and "said" may be intended to include plural forms as well, unless the context clearly indicates otherwise. It should be further understood that the terms "includes/including" used in this specification specify the presence of stated features, integers, steps, operations, elements, and/or components, but do not preclude the presence or addition of one or more other features, integers, steps, operations, elements, components, and/or groups thereof. It should be understood that when a component is referred to as being "connected to" or "coupled to" another component, it can be directly connected or coupled to the other element or intervening elements may be present. In addition, the "connected to" or "coupled to" may also refer to wireless connection or couple. As used herein, the term "and/or" includes any and all combinations of one or more of the associated listed items.

Unless otherwise defined, all terms (including technical and scientific terms) used herein have the same meaning as commonly understood by one of ordinary skill in the art to which the present invention belongs. It shall be further understood that terms, such as those defined in commonly used dictionaries, should be interpreted as having a meaning that is consistent with their meaning in the context of the relevant art and will not be interpreted in an idealized or overly formal sense unless expressly so defined herein.

Those skilled in the art will understand that the term "terminal" or "terminal equipment" used herein compasses not only devices with a wireless signal receiver having no emission capability but also devices with receiving and emitting hardware capable of carrying out bidirectional communication over the two-way communication link. This kind of devices may include a cellular or other communication device with or without a multi-line display; a personal communication system (PCS) with combined functionalities of voice and data processing, facsimile and/or data communication capability; may include a PDA having a RF receiver and an internet network/intranet access, web browser, notepad, calendar and/or global positioning system (GPS) receiver; and/or a conventional laptop and/or palm computer or other devices having a RF receiver. The "terminal" or "terminal equipment" used herein may refer to portable, transportable, fixed on a transportation (aviation, maritime and/or terrestrial) or suitable for and/or configured to run locally and/or run in the form of distribution on the earth and/or other places in the spaces. The "terminal" or "terminal equipment" used herein may also refer to a communication terminal, Internet terminal or music/video player terminal, for example, PDA, MID, and/or mobile phone with music/video playback capabilities etc. It may also refer to a TV, a set top box, etc.

As described in the background art, with the introduction of the two-dimensional antenna structure and the sharp increase of the number of antennae, still within the full-bandwidth range, if the original signals of CSI RSs are sent simultaneously in all two-dimensional antenna arrays, a lot of downlink physical resources will be occupied by the CSI RSs, and the data transmission is thus influenced. In addition, because it is required to feed back horizontal and vertical PMIs simultaneously, the uplink physical resources occupied by the feedback information will increase greatly. However, in fact, the rate of change in a horizontal direction angle where UE is located is different from the rate of change in a vertical direction angle. On this basis, the present application provides a CSI feedback solution, including the design of CSI RSs, the determination of CSI RS bandwidth, and a feedback method of a horizontal PMI/vertical PMI and CQI.

Meanwhile, by pre-coding the CSI RSs, the transmission performance of the CSI RSs may be improved, so that the accuracy of the channel estimation to a reference signal is improved, and the system performance is enhanced. Here, the CSI RSs are sent to UE after being pre-coded by a pre-coding matrix, so the channel information estimated according to the CSI RSs is regarded as equivalent channel information. Through the equivalent channel information, a new PMI and CQI after the use of the pre-coding matrix may be obtained.

To realize the object of the present invention, one aspect of an application scenario of the present invention provides a method for reporting channel state information, including the following steps of:

acquiring, by UE, information about at least two sets of CSI RSs, wherein the information about CSI RSs includes time domain resource and frequency domain resource occupied by CSI RSs; and measuring, by the UE, a reference signal according to the information about at least two sets of CSI RSs, determining channel state information, and reporting the channel state information to a base station.

By the above technical solution provided by the present invention, after pre-coding the CSI RSs, the system performance can be improved, and the resources occupied by the CSI RSs may be greatly saved in practical applications, so that more downlink physical resources may be used for transmission of physical downlink shared channels (PDSCH), thereby increasing the throughput of downlink traffic.

Figure 6:
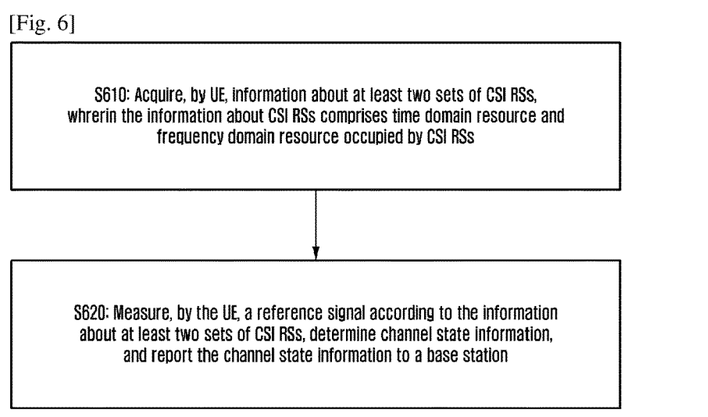
FIG. 6 is a flowchart of a method for reporting CSI according to an embodiment of the present invention.

The specific implementation of the present application will be described as below in details with reference to specific embodiments. FIG. 6 is a flowchart of a method for reporting CSI according to an embodiment of the present invention. As shown in FIG. 6, the method includes the following steps:

S610: UE acquires information about at least two sets of CSI RSs, wherein the information about CSI RSs includes time domain resource and frequency domain resource occupied by CSI RSs.

Specifically, the information about CSI RSs refers to CSI RS subframe configuration and CSI RS configuration. That is, the time domain resource refers to the CSI RS subframe configuration, and the CSI RS subframe configuration refers to the periodicity and time offset of a subframe having the CSI RSs; and, the frequency domain resource refers to the CSI RS configuration, and the CSI RS configuration refers to position of PRBs occupied by the CSI RSs in a subframe and position of resource elements (RE) occupied in the PRBs.

As an embodiment of the present invention, the information about CSI RSs is acquired by the UE according to high-level signaling configuration or predetermined according to a communication protocol.

As an embodiment of the present invention, the information about at least two sets of CSI RSs includes:

information about CSI RSs with respect to a vertical antenna subarray and information about CSI RSs with respect to a horizontal antenna subarray, wherein the information about CSI RSs is independent from each other.

Apparently, a number of sets of CSI RSs may be defined. The example taking the CSI RSs with respect to a vertical antenna subarray and CSI RSs with respect to a horizontal antenna subarray is merely used for describing the present invention.

Specifically, the CSI RSs are designed into independent information about two sets of CSI RSs, and the information about two sets of CSI RSs is independent from each other in terms of configuration periodicity and time offset. For example, the information about two sets of CSI RSs may be configured independently by high-level signaling. The independent information about CSI RSs includes CSI RS configuration and CSI RS subframe configuration. The CSI RS configuration and the CSI RS subframe configuration may be CSI RS configuration and CSI RS subframe configuration determined by the present 3GPP, or newly set CSI RS configuration and newly-set CSI RS subframe configuration. Specifically, the CSI RS configuration refers to physical resource blocks (PRBs) occupied by the CSI RSs in one subframe and resource elements occupied in one PRB. For example, CSI RSs are distributed in all PRBs of the system bandwidth of a carrier, and REs occupied in each PRB are as shown in Table 1, as CSI RS configuration shown in Table 1. The bandwidth occupied by the CSI RSs may be the bandwidth of the whole system or a subset of the bandwidth of the whole system. For example, the bandwidth occupied by the CSI RSs may be configured by high-level signaling, or determined according to a protocol, or may change with the bandwidth reported by the CSI. To describe more clearly, a mapping relation between the frame structure type, the CSI RS configuration and the number of the configured CSI RSs may be established. The position of REs occupied in each PRB is determined a binary group (k', l') in Table 1. The CSI-RS of each port occupies two REs. The frequency domain position of the two REs is determined by k' and a port number, and the time domain position thereof is determined by l', specifically as shown in Table 1.

TABLE 1

|  | CSI RS configuration | \multicolumn{6}{c}{The number of configured CSI RSs} |
| --- | --- | --- | --- | --- | --- | --- | --- |
|  |  | 1 or 2 | | 4 | | 8 | |
|  |  | (k',l') | $n_s \bmod 2$ | (k',l') | $n_s \bmod 2$ | (k',l') | $n_s \bmod 2$ |
| Frame structure types 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Just for frame structure type 2 | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

<Table of Mapping Between Frame Structure Type, CSI RS Configuration and Number of Configured CSI RSs>

The CSI RS subframe configuration refers to the position of a subframe occupied by the CSI RSs. A subframe, meeting the condition that $(10n_f + \lfloor n_s/2 \rfloor - \Delta_{CSI\text{-}RS})$ mo$T_{CSI\text{-}RS} = 0$, is a subframe for CSI RS transmission, where of denotes a system frame number, and ns denotes a time slot number in the system frame. The specific configurations are as shown in Table 2. To describe more clearly, a mapping relation between the frame structure type, the CSI RS configuration and the number of the configured CSI RSs may be established, specifically as shown in Table 2.

TABLE 2

| CSI-RS-Subframe Configuration ($I_{CSI\text{-}RS}$) | CSI-RS periodicity ($T_{CSI\text{-}RS}$) (subframes) | CSI-RS subframe offset ($\Delta_{CSI\text{-}RS}$) (subframes) |
|---|---|---|
| 0-4 | 5 | $I_{CSI\text{-}RS}$ |
| 5-14 | 10 | $I_{CSI\text{-}RS} - 5$ |
| 15-34 | 20 | $I_{CSI\text{-}RS} - 15$ |
| 35-74 | 40 | $I_{CSI\text{-}RS} - 35$ |
| 75-154 | 80 | $I_{CSI\text{-}RS} - 75$ |

Table of Mapping Between CSI RS Subframe Configuration, CSI RS Periodicity and CSI RS Subframe Offset>

If the CSI RSs are designed into information about two independent sets of CSI RSs, the CSI RS subframe configurations of the information about two independent sets of CSI RSs are independent from each other. For example, UE may acquire the CSI RS resource configuration and the CSI RS subframe configuration of each CSI RS configuration by receiving instructions of high-level signaling. In the information about two sets of CSI RSs, one set may be designed with respect to a vertical antenna subarray, while the other set may be designed with respect to a horizontal antenna subarray. As the rate of change in the horizontal direction angle where the UE is located is quicker than the rate of change in the vertical direction angle, the transmission periodicity of the CSI RSs in the vertical subarray may be longer than that of the CSI RSs in the horizontal subarray. In this way, the number of times of transmitting CSI RSs in the vertical subarray may be reduced, and the uplink resources occupied by the PMI feedback may be reduced because the periodicity of the PMI feedback with respect to the vertical subarray becomes longer.

As an embodiment of the present invention, the frequency domain resource occupied by the CSI RSs includes any one of the following ways:

the frequency domain resource occupied by the CSI RSs is the bandwidth of the whole downlink; and the frequency domain resource occupied by the CSI RSs is a subset of the bandwidth of the whole downlink Further, the event that the frequency domain resource occupied by the CSI RS is a subset of the bandwidth of the whole downlink includes:

positions of PRBs occupied by the CSI RSs in a subframe are the same; and/or, positions of PRBs occupied by the CSI RSs in a subframe are different.

The above embodiment will be described as below with reference to a specific application scenario.

Application Scenario 1:

This application scenario 1 provides a method for determining the bandwidth occupied by the CSI RSs. Here, the bandwidth is expressed by the number of PRBs. The number of PRBs occupied by two or more sets of CSI RSs and the position occupied by the PRBs may be the same or different, and the determination methods may be thus the same or different. The following may be a possible method for determining the bandwidth occupied by the CSI RSs.

Solution 1:

Bandwidth occupied by one type of CSI RSs: the bandwidth corresponding to the frequency domain positions occupied by the CSI RSs is the bandwidth of the whole downlink system. For example, when the bandwidth of the downlink system indicated by the MIBs is 20 M, the CSI RSs are distributed on N (N=110) physical resource blocks (PRBs).

Solution 2:

Bandwidth occupied by one type of CSI RSs: the bandwidth corresponding to the frequency domain positions occupied by the CSI RSs is a subset of the bandwidth of the whole downlink system. For example, when the bandwidth of the downlink system indicated by the MIBs is 20 M, the CSI RSs are distributed on N (N<110) physical resource blocks (PRBs).

Solution 3:

Bandwidth occupied by another type of CSI RSs: the bandwidth occupied by the CSI RSs is a subset of the bandwidth of the whole downlink system. Within all available subframes of the CSI RSs, the positions of the PRBs occupied by the CSI RSs are the same. In this case, it is convenient for the UE to measure channel state information in different subframes. This is because, in all available subframes of the CSI RSs, the CSI RSs of any PRB pair or the CSI RSs of combinations of PRB pairs may be measured within the bandwidth of the available CSI RSs.

When the bandwidth occupied by the CSI RSs is a subset of the system bandwidth, the UE acquires the bandwidth position occupied by a specific CSI RS in the following way.

By receiving instructions of high-level signaling, the UE acquire the bandwidth acquired by CSI RSs. Through the indication of the instructions of high-level signaling, the UE knows which PRBs have the CSI RSs. In this way, the UE may perform CSI measurement to the available PRB pairs or combinations of PRB pairs. For example, a system configures the starting PRB of a CSI RS and the number of PRBs occupied by the CSI RS via high-level singling. After receiving the high-level signaling, the UE knows the PRB pairs or combinations of PRB pairs occupied by the CSI RS, and then it measures the channel state information on the corresponding bandwidth. In such a way, the bandwidth occupied by the CSI RSs may be configured freely without limitations. Alternatively, the bandwidth occupied by the CSI RSs may be predefined according to a communication standard.

Figure 7:
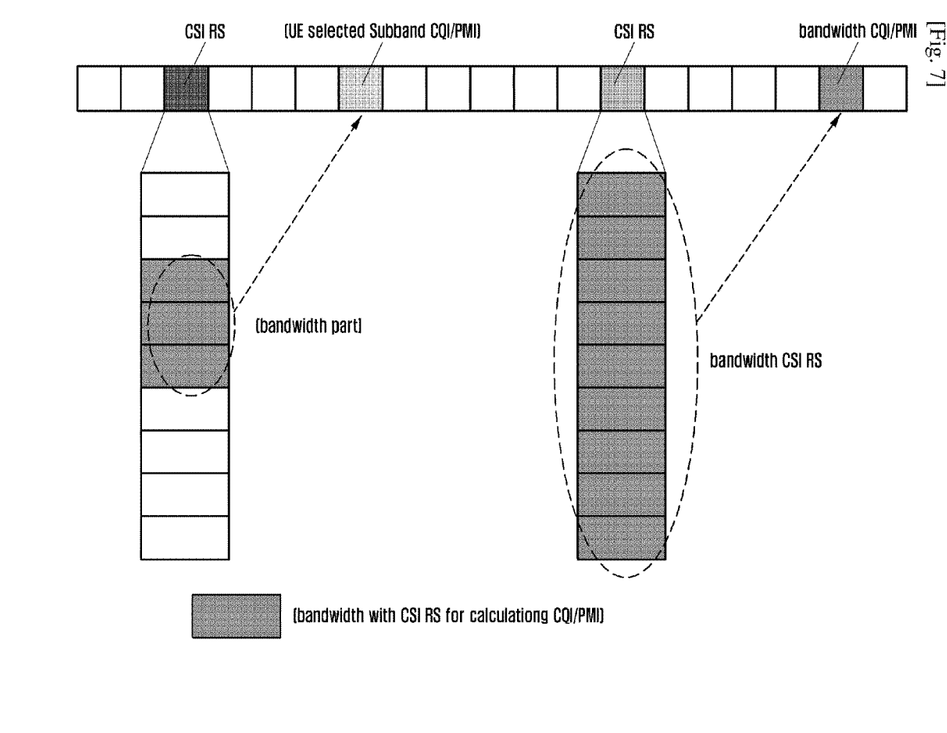
FIG. 7 is a schematic diagram of a sequential relationship between CSI RS configuration and CSI reporting.

Solution 4:

Bandwidth occupied by another type of CSI RSs: the bandwidth occupied by the CSI RSs is a subset of the bandwidth of the whole downlink system. For CSI RSs in different subframes, the position and number of PRBs occupied by the CSI RSs may be different or the same. For example, the position and number of the PRBs occupied by the CSI RSs change with the number and position of PRBs, which are required by the CSI and to be reported by the UE. First, the CSI RS subframe configuration is determined by the periodicity and time offset of the CSI RSs in Table 2. When the PMI and/or RI/PMI/CQI to be reported by the UE is a wideband PMI and/or wideband RI/PMI/CQI, the UE considers that the bandwidth occupied by the measured CSI RSs is a wideband, i.e., the system bandwidth. When the PMI and/or RI/PMI/CQI to be reported by the UE is a PMI selected by UE subbands and/or a RI/PMI/CQI selected by the UE subbands, the UE considers that the bandwidth occupied by the measured CSI RSs is a bandwidth part (BP), as shown in FIG. 7. The bandwidth parts included in each system bandwidth are associated with the system bandwidth, and the PRBs included in each subband are also associated with the system bandwidth, as shown in Table 3. For example, if the system bandwidth is 50RB, each subband includes six RBs and three bandwidth parts. To describe more clearly, a mapping relation between the system bandwidth, the size of subbands and the number of bandwidth parts may be established, specifically as shown in Table 3.

TABLE 3

| System bandwidth $N^{DL}_{RB}$ | The size of subbands k (RBs) | The number of bandwidth parts (J) |
|---|---|---|
| 6-7 | NA | NA |
| 8-10 | 4 | 1 |
| 11-26 | 4 | 2 |
| 27-63 | 6 | 3 |
| 64-110 | 8 | 4 |

<Table of Mapping Between System Bandwidth, Size of Subbands and Number of Bandwidth Parts>

S602: The UE measures a reference signal according to the information about at least sets of CSI RSs, determines channel state information and reports the channel state information to a base station.

The UE calculates a PMI according to CSI RSs indicated by information about one set (recorded as CA) of the plurality of sets of CSI RSs. The PMI is corresponding to a certain specific pre-coding codebook space. The pre-coding codebook space is corresponding to the CA and may be predefined according to a standard or indicated by high-level signaling. Preferably, the pre-coding codebook space contains an optional pre-coding codebook for a vertical antenna subarray in a two-dimensional antenna array. The UE should feedback the calculated PMI to the base station.

The UE calculates a RI and/or a PMI and/or a CQI according to the CSI RSs indicated by information about the other set (recorded as CB) of the plurality of sets of CSI RSs, rather than the CA. The PMI is corresponding to a certain specific pre-coding codebook space. The pre-coding codebook space is corresponding to the CB and may be predefined according to a standard or indicated by high-level signaling. Preferably, the pre-coding codebook space contains an optional pre-coding codebook for a two-dimensional antenna array. The UE should feedback the RI and/or PMI and/or CQI to the base station.

For example, the base station sends CSI RSs in a vertical antenna subarray, and then UE performs channel estimation according to the received CSI RSs in the vertical antenna subarray and determines a vertical pre-coding matrix. The UE feeds back a PMI corresponding to the vertical pre-coding matrix to the base station. The base station applies the previously obtained vertical pre-coding matrix in the two-dimensional antenna array to obtain pre-coded CSI RSs for a horizontal antenna subarray, then reconstructs CSI RSs with respect to the two-dimensional antenna array, and sends on the two-dimensional antenna array the CSI RSs to the UE. The UE acquires the RI, OMI and CQI according to the pre-coded CSI RSs, and then feeds them back to the base station. As an embodiment of the present invention, PRBs processed by a same pre-coding matrix form a same PRB set, and the UE performs joint channel estimation to all or a part of CSI RSs in the same PRB set when measuring a reference signal according to the CSI RSs in the same PRB set.

The above embodiment will be described with reference to a specific application scenario.

Application Scenario 2:

This application scenario provides a method for determining bandwidth having the same pre-coding in the bandwidth occupied by CSI RSs. Here, the bandwidth is expressed by the number of PRBs. The number of PRBs occupied by two or more CSI RSs and the positions of the PRBs may be the same or different, and the determination methods may be thus the same or different. The following is a possible method for determining bandwidth having the same pre-coding in the CSI RSs.

The CSI RSs used by the UE to perform channel state information estimation are pre-coded signals. Therefore, as described above, the estimated channel state information is equivalent channel state information. Specifically, during the channel state estimation, similar to an existing method, separate channel estimation may be performed according to the CSI RSs on each PRB.

Alternatively, in order to further improve the performance of channel estimation, when the base station pre-codes the CSI RSs, a same pre-coding matrix may be employed for a plurality of PRBs. Thus, in this step, when the UE performs channel estimation, joint channel estimation may be performed to the CSI RSs on a plurality of PRBs using a same pre-coding matrix, so that the performance of channel estimation is improved.

Specifically, the PRBs using a same coding matrix may form a PRB set. When estimating CSI RS channel state information and calculating the CQI and/or PMI, the UE considers that the CSI RSs on the PRB set employ the same pre-coding matrix. In order to correctly perform joint channel estimation to a plurality of CSI RSs, the UE needs to determine which PRBs belong to the same PRB set, specifically as follows:

1. The number of PRBs included in one PRB set is associated to the bandwidth for the CSI RS transmission. According to the current bandwidth occupied by the CSI RSs, the UE determines the number of PRBs included in one PRB set. For example, a correspondence is established between the number of PRBs included in one PRB set and the bandwidth for the CSI RS transmission, as shown in Table 4. The bandwidth of the CSI RSs refers to the number of PRBs for transmitting the CSI RSs, and the PRG size refers to PRBs considered by the UE as using a same pre-coding matrix within a PRG size, i.e., the number of PRBs included in one PRB set. Of course, Table 4 is merely an example, and other correspondences may be established. Preferably, the larger the bandwidth for the CSI RS transmission is, and the more the number of PRBs included in one PRB set is. To describe more clearly, a mapping relation between the CSI RS bandwidth and the PRG size may be established, specifically as shown in Table 4.

TABLE 4

| CSI RS bandwidth | PRG size (P') (PRBs) |
|---|---|
| ≤10 | 1 |
| 11-26 | 2 |
| 27-63 | 3 |
| 64-110 | 4 |

<Table of Mapping Between CSI RS Bandwidth and PRG Size>

2. The number of PRBs included in one PRB set is associated with the bandwidth of a downlink system. According to the bandwidth of the downlink system, the UE determines the number of PRBs included in one PRB set. For example, similar to the first way, a correspondence may be established between the number of PRBs included in one PRB set and the bandwidth of the downlink system, as shown in Table 5. Where, the size of the downlink system may be acquired by the UE by receiving a main information block (MIB) or high-level signaling. The way of acquiring the size of the downlink system is the same as the existing way and will not be repeated here. To describe more clearly, a mapping relation between the bandwidth of the downlink system and the PRG size may be established, specifically as shown in Table 5.

TABLE 5

| Bandwidth of a downlink system ($N^{DL}_{RB}$) | PRG size (P') (PRBs) |
|---|---|
| ≤10 | 1 |
| 11-26 | 2 |
| 27-63 | 3 |
| 64-110 | 4 |

<Table of Mapping Between Bandwidth of Downlink System and PRG Size>

3. Semi-static configuration way

The number of PRBs included in one PRB set may be set in a manner of semi-static configuration, and the PRBs employ CSI RSs of a same pre-coding matrix. According to the semi-static configuration of the system, the UE determines the number of PRBs included in one PRB set.

Alternatively, the specific determination way of the number of PRBs included in one PRB set may be set in a manner of semi-static configuration. For example, the corresponding number of PRBs is determined in a manner of configuration according to the bandwidth of the downlink system, or the corresponding number of PRBs is determined in a manner of configuration according to the bandwidth occupied by the CSI RSs. That is, in a manner of semi-static configuration, the parameters in the Way 1 or 2 mentioned above may be set for determining the number of PRBs. The UE, according to the manner of semi-static configuration, sets the parameters in the Way 1 or 2 mentioned above for determining the number of PRBs included in one PRB set.

Due to the semi-static configuration, the corresponding number of PRBs or the way of determining the number of PRBs may also be updated as required. For example, for a PRB subset of CSI RSs using a same pre-coding matrix, the number of PRBs included in this PRB subset is configured by high-level signaling, and the UE acquires the number of PRBs included in one PRB set by reading the high-level singling. The PRBs have CSI RSs of the same pre-coding matrix.

4. The number of PRBs included in a PRB set of CSI RSs using a same pre-coding matrix may also be fixedly set by the system. That is, regardless of the bandwidth for transmitting the CSI RSs and the system bandwidth, in a PRB subset of CSI RSs using a same pre-coding matrix, the number of PRBs included in this PRB subset is fixed. For example, in a PRB subset of CSI RSs using a same pre-coding matrix, there are four PRBs in this PRB subset.

In the above ways, the CSI RSs using a same pre-coding matrix are determined, so that channel estimation is performed to these CSI RSs jointly, and the CQI and/or PMI are calculated. Performing channel estimation to all CSI RSs in a same PRB set or a part of CSI RSs in a same PRB set jointly may be specifically set as required.

As an embodiment of the present invention, the UE receives indication information in a (E)PDCCH, where the indication information is used for indicating whether there is any CSI RS in the PRB of the PDSCH. In this embodiment of the present invention, the (E)PDCCH refers to a PDCCH or an E-PDCCH.

The above embodiment will be described as below with reference to a specific application scenario.

Application Scenario 3:

When scheduling PDSCH data of a certain downlink subframe, the base station needs to send a corresponding (E)PDCCH to realize this scheduling, and whether there is any CSI RS in the PRB occupied by the PDSCH data will be indicated by the information in the (E)PDCCH or by other methods. On this basis, the present application suggests that: when scheduling the PDSCH of any one downlink subframe, the base station may carry an indicator by scheduling the (E)PDCCH of the downlink subframe so as to indicate whether there is any CSI RS in the PRB scheduled by the (E)PDCCH. By receiving the indication information, the UE may determine whether there is any CSI RS in the scheduled PDSCH resources, and may further determine information about the rate matching of the PDSCH, i.e., whether there is any punching to the resources occupied by the CSI RSs.

To realize the above indication, the present application provides the following ways of indication.

By adding 1 bit of information into the (E)PDCCH scheduling the PDSCH, or by using 1 fill bit in the (E)PDCCH, or redefining the existing bit in the (E)PDCCH, it is indicated whether there is any CSI RS in the PRB transmitting the PDCSH. The CSI RS configuration is determined by high-level singling.

For example, assumed that 1 bit of "CSI RS resource indication information" is used for indication, it may be defined as follows: when the "CSI RS resource indication information" is "0", it is indicated that there is no CSI RS in the PRB scheduled by the (E)PDCCH; and, when the "CSI RS resource indication information" is "1", it is indicated that there are CSI RSs in the PRB scheduled by the (E)PDCCH. The bandwidth occupied by the CSI RSs is the bandwidth of the PDSCH scheduled by the (E)PDCCH. The number and position of REs occupied by the CSI RSs in each PRB are configured by high-level signaling. The CSI RS configuration may be one as shown in Table 1, or a newly defined CSI RS configuration. To describe more clearly, a mapping relation between the CSI RS resource indication information and the description may be described, specifically as shown in Table 6.

TABLE 6

| CSI RS resource indication information | Description |
|---|---|
| 0 | There is no CSI RS in the PRB |
| 1 | There are CSI RSs in the PRB |

<Table of Mapping Between CSI RS Resource Indication Information and Description>

As an embodiment of the present invention, the UE receives channel quality indication request information, where the channel quality indication request information includes 1 bit or 2 bits and is used for requesting the UE to measure a reference signal according to the information about at least two sets of CSI RSs and report corresponding channel state information to the base station.

The above embodiment will be described as below with reference to a specific application scenario.

Application Scenario 4:

When scheduling the PUSCH data of a certain uplink subframe, the base station needs to send a corresponding (E)PDCCH to this scheduling, so as to schedule a CQI request domain in the (E)PDCCH of the PUSCH, and then redefines according to the report of two sets of PMIs or RIs/CQIs/PMIs to be triggered. Here, the report of two sets of PMIs or RIs/CQIs/PMIs refers to the report of the PMIs or RIs/CQIs/PMIs obtained by measuring two sets of CSI RSs according to two sets of CSI information. The following two sets of CSIs refer to two sets of CSI RSs obtained according to the two sets of CSI information.

Bit number of one CQI request domain: when what is to be triggered by the CQI request domain is "the report of PMIs or RIs/CQIs/PMIs with respect to two sets of CSI RSs", the CQI request includes 2 bits. The specific indication information of 2 bits of the CQI request domain is as shown in Table 7. To describe more clearly, a mapping relation between the value of the CQI request domain and the description may be established, specifically as shown in Table 7.

TABLE 7

| The value of CQI request domain | Description |
| --- | --- |
| '00' | No report of non-periodic CSI |
| '01' | Report of non-periodic CSI with respect to the first set of CSI RSs |
| '10' | Report of non-periodic CSI with respect to the second set of CSI RSs |
| '11' | Report of two sets of non-periodic CSIs with respect to the first set of CSI RSs and the second set of CSI RSs |

<Table of Mapping Between Value of CQI Request Domain and Description>

Bit number of another CQI request domain: when what is to be triggered by the CQI request domain is "the report of PMIs or RIs/CQIs/PMIs with respect to two sets of CSI RSs", the CQI request includes 2 bits. The specific indication information of 2 bits of the CQI request domain is as shown in Table 8. To describe more clearly, a mapping relation between the value of the CQI request domain and the description may be established, specifically as shown in Table 8.

TABLE 8

| The value of CQI request domain | Description |
| --- | --- |
| '00' | No report of non-periodic CSI |
| '01' | Report of the first set of non-periodic CSI of the high-level configuration |
| '10' | Report of the second set of non-periodic CSI of the high-level configuration |
| '11' | Report of the third set of non-periodic CSI of the high-level configuration |

<Table of Mapping Between Value of CQI Request Domain and Description>

Bit number of yet another CQI request domain: when what is to be triggered by the CQI request domain is "the report of PMIs or RIs/CQIs/PMIs with respect to two sets of CSI RSs", the CQI request includes 1 bit or 2 bits. The specific indication information of two bits of the CQI request domain is as shown in Table 7 or Table 8. The specific indication information of 1 bit of the CQI request domain is as shown in Table 9. To describe more clearly, a mapping relation between the value of the CQI request domain and the description may be established, specifically as shown in Table 9.

TABLE 9

| The value of CQI request domain | Description |
| --- | --- |
| '0' | No report of non-periodic CSI |
| '1' | Report of two sets of non-periodic CSIs with respect to the first set of CSI RSs and the second set of CSI RSs |

<Table of Mapping Between Value of CQI Request Domain and Description>

As an embodiment of the present invention, the UE receives, on a subframe where the channel quality indication request information is received, CSI RSs of a type required by the channel quality indication request information.

The above embodiment will be described as below with reference a specific application scenario.

Application Scenario 5:

When scheduling the PUSCH data of a certain uplink subframe, the base station needs to send a corresponding (E)PDCCH to do this scheduling, so as to schedule a CQI request domain in the (E)PDCCH of the PUSCH. The CQI request domain is used for triggering the report of one or two sets of PMIs or RIs/CQIs/PMIs. The resource of the channel state information reference signal measured by the UE may be a channel state information reference signal (SIRS) on the (E)PDCCH subframe scheduling the PUSCH. When what is to be triggered by the CQI request is "report of non-periodic CSI with respect to the first set of CSI RSs", the UE considers that, on a subframe of the sent CQI request, there are CSI RSs corresponding to the report of non-periodic CSI with respect to the first set of CSI RSs, wherein the corresponding CQI request is used for triggering the report of non-periodic CSI with respect to the first set of CSI RSs. When what is to be triggered by the CQI request is "report of non-periodic CSI with respect to the second set of CSI RSs", the UE considers that, on a subframe of the sent CQI request, there are CSI RSs corresponding to the report of non-periodic CSI with respect to the second set of CSI RSs, wherein the corresponding CQI request is used for triggering the report of non-periodic CSI with respect to the second set of CSI RSs. When what is to be triggered by the CQI request is "report of non-periodic CSIs with respect to the first set of CSI RSs and the second set of CSI RSs", the UE considers that, on a subframe of the sent CQI request, there are CSI RSs according to the report of non-periodic CSIs with respect to the first set of CSI RSs and the second set of CSI RSs, wherein the corresponding CQI request is used for triggering the report of non-periodic CSIs with respect to the first set of CSI RSs and the second set of CSI RSs.

As an embodiment of the present invention, when ports of one set of CSI RSs are more than resource units of CSI RS configuration in the existing standard, the CSI RS configuration includes:

resource units of CSI RS configuration on other OFDM symbols in the existing standard, if the ports are more than resource units of CSI RS configuration in the existing standard; or other resource units on a same OFDM symbol, if the ports are more than resource units of CSI RS configuration in the existing standard.

The above embodiment will be described as below with reference to a specific application scenario.

Figure 8:
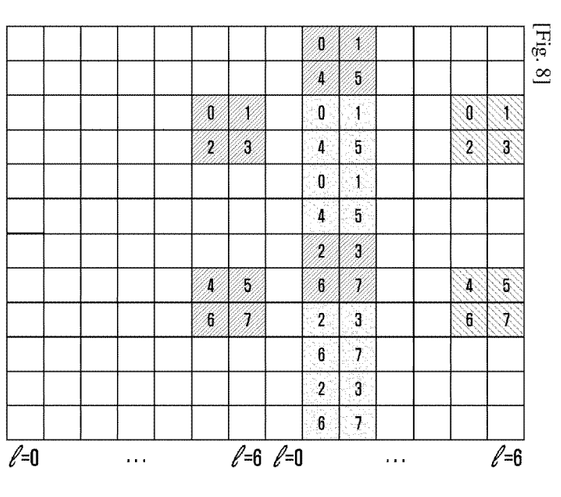
FIG. 8 is a schematic diagram of RE occupied by CSI RSs of a horizontal antenna subarray.

Application Scenario 6:

During the CSI RS configuration, the current CSI RS has eight ports at most. The CSI RS configuration is as shown in Table 1. In one PRB, the specific distribution of REs transmitted as CSI RSs is as shown in FIG. 8. Eight CSI RS REs are symmetrically distributed in two OFDM symbols. There are total five sets of CSI RSs each having eight ports, and each set of CSI RSs having eight ports occupies eight REs. Each set of CSI RSs in this present invention may have more than eight ports, so each set of CSI RSs will occupy more than eight REs.

Figure 9:
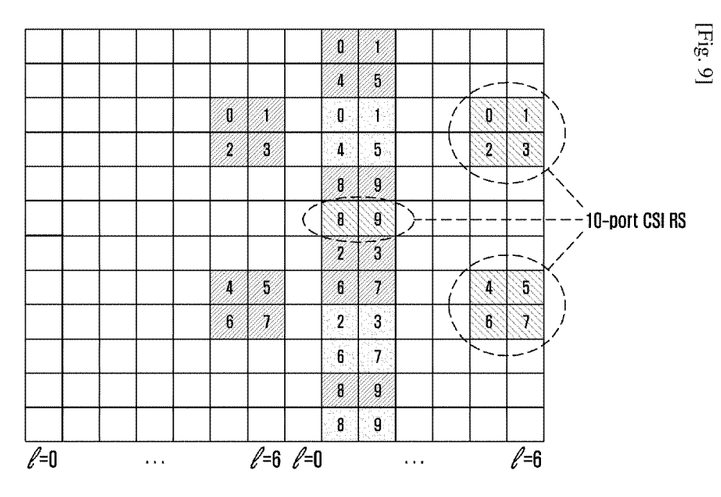
FIG. 9 is a schematic diagram of RE occupied by CSI RSs of a vertical antenna subarray.

In one distribution of one CSI RS: when each set of CSI RSs occupies more than eight REs, the spare REs are still the resources of the current CSI RS. For example, when there are ten ports in a CSI RS, eight of these ten ports occupy eight REs configured in Table 1, while the other two ports occupy REs configured by another CSI RS. Furthermore, all the REs have the same transmitting power, as shown in FIG. 9.

Figure 10:
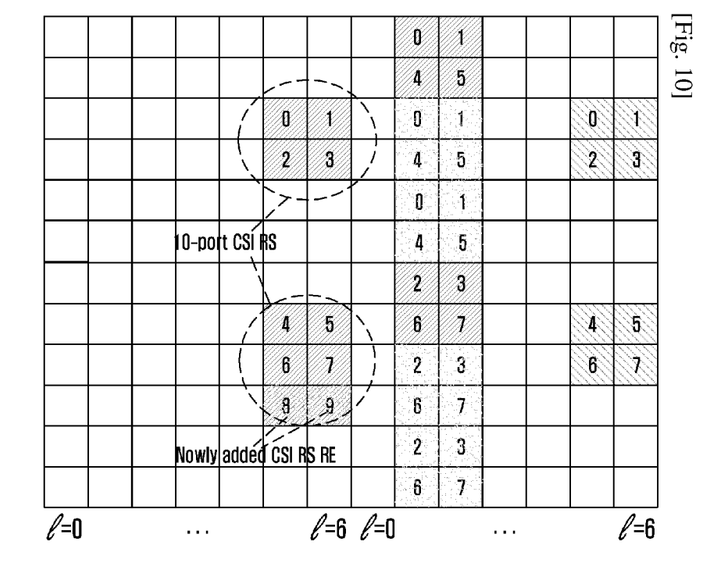
FIG. 10 is another schematic diagram of RE occupied by CSI RSs of a vertical antenna subarray.

In one distribution of another CSI RS: when each set of CSI RSs occupies more than eight REs, the spare REs may be not the resources of the current CSI RS. For example, when there are ten ports in a CSI RS, eight of these ten ports occupy eight REs configured in Table 1, while the other two ports occupy two newly added REs on the same OFDM symbol rather than REs configured by the current CSI RS. All the REs have the same transmitting power, as shown in FIG. 10.

In conclusion, by the technical solutions provided by the present invention, after pre-coding the CSI RSs, the system performance can be improved, and the resources occupied by the CSI RSs may be greatly saved in practical applications, so that more downlink physical resources may be used for transmission of physical downlink shared channels (PDSCH), thereby increasing the throughput of downlink traffic. In addition, by performing, by UE, joint channel estimation to a plurality of CSI RSs using a same pre-coding, the accuracy of the CSI RS channel estimation is improved.

Figure 11:
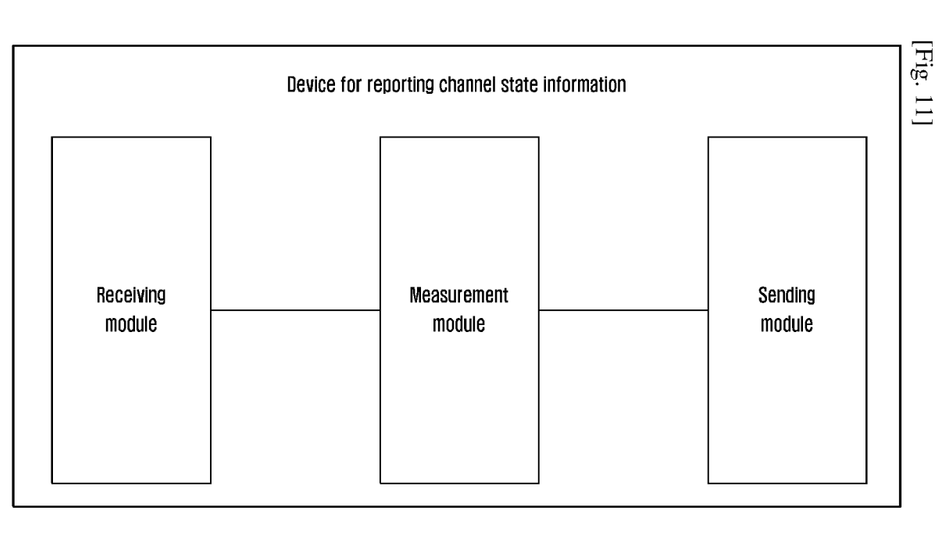
FIG. 11 is a structure of a device for reporting channel state information according to an embodiment of the present invention.

As shown in FIG. 11, to realize the object of the present invention, an embodiment of the present invention provides a device for reporting channel state information, including a receiving module 110, a measurement module 120 and a sending module 130.

The receiving module 110 is configured to acquire information about at least two sets of CSI RSs, wherein the information about CSI RSs includes time domain resource and frequency domain resource occupied by CSI RSs.

Specifically, the information about CSI RSs is acquired by the receiving module 110 according to high-level signaling configuration or predetermined according to a communication protocol.

Further, the frequency domain resource occupied by the CSI RSs, acquired by the receiving module 110, includes any one of the following ways:

the frequency domain resource occupied by the CSI RSs is the bandwidth of the whole downlink; and the frequency domain resource occupied by the CSI RSs is a subset of the bandwidth of the whole downlink.

Further, the event that the frequency domain resource occupied by the CSI RS, acquired by the receiving module 110, is a subset of the bandwidth of the whole downlink includes:

positions of PRBs occupied by the CSI RSs in a subframe are the same; and/or, positions of PRBs occupied by the CSI RSs in a subframe are different.

Further, the receiving module 110 receives indication information in a (E)PDCCH, the indication information being used for indicating whether there is any CSI RS in the PRB of the PDSCH.

Further, the receiving module 110 receives channel quality indication request information, the channel quality indication request information including 1 bit or 2 bits and being used for requesting the measurement module to measure a reference signal according to the information about at least two sets of CSI RSs and report corresponding channel state information to the base station.

Further, the receiving module 110 receives, on a subframe where the channel quality indication request information is received, CSI RSs of a type required by the channel quality indication request information.

Further, when ports of one set of CSI RSs are more than resource units of CSI RS configuration in the existing standard, the CSI RS configuration acquired by the receiving module 110 includes:

resource units of CSI RS configuration on other OFDM symbols in the existing standard, if the ports are more than resource units of CSI RS configuration in the existing standard; or other resource units on a same OFDM symbol, if the ports are more than resource units of CSI RS configuration in the existing standard.

The measurement module 120 is configured to measure a reference signal according to the information about at least two sets of CSI RSs and determine channel state information.

Specifically, the information about at least two sets of CSI RSs used by the measurement module 120 includes:

information about CSI RSs with respect to a vertical antenna subarray and information about CSI RSs with respect to a horizontal antenna subarray, wherein the information about CSI RSs is independent from each other.

Further, the measurement module 120 uses PRBs processed by a same pre-coding matrix as a same PRB set, and then performs joint channel estimation to all or a part of the CSI RSs in the same PRB set when measuring a reference signal according to the CSI RSs in the same PRB set.

The sending module 130 is configured to report the channel state information to a base station.

By the device provided by the present invention, after pre-coding the CSI RSs, the system performance can be improved, and the resources occupied by the CSI RSs may be greatly saved in practical applications, so that more downlink physical resources may be used for transmission of physical downlink shared channels (PDSCH), thereby increasing the throughput of downlink traffic. In addition, by performing, by UE, joint channel estimation to a plurality of CSI RSs using a same pre-coding, the accuracy of the CSI RS channel estimation is improved.

A person skilled in the art can understand that the present invention may involve devices for carrying out one or more the operations as described in the present application. The devices can be specially designed and manufactured as required, or can include well known equipment in a general-purpose computer which stores programs that are selectively activated or reconstructed. Computer programs as such can be stored in device (such as computer) readable media or in any type of medium suitable for storing electronic signaling and respectively coupled to a bus, the computer readable medium includes but not limited to any type of disk (including floppy disk, hard disk, optical disk, CD-ROM, and magneto optical disk), random access memory (RAM), read-only memory (ROM), electrically programmable ROM, electrically erasable Read-Only Memory (EEROM), electrically erasable programmable Read-Only Memory (EEPROM), flash memory, magnetic card or optical line card. That is, the readable media include any mechanism for storing or transmitting information in a device (for example, computer) readable form.

It should be understood by a person skilled in the art that computer program instructions can be used to realize these structural diagrams and/or each block in block diagrams and/or flow charts as well as a combination of these structural diagrams and/or blocks in the block diagrams and/or flow diagrams. These computer program instructions can be provided to general purpose computers, special purpose computers or other processors of programmable data processing means to produce a machine, so that the instructions are executed by the computers or the processors of programmable data processing means to create a designated method for effecting the structural diagram and/or a block or blocks of block diagrams and/or flow diagrams.

A person skilled in the art can understand that the operations, the methods, the steps in the flows, the measures, the schemes discussed in the invention can be replaced, changed, combined or deleted. Further, the operations, the methods, the other steps in the flows, the measures, the schemes discussed in the invention can also be replaced, changed, rearranged, combined or deleted. Further, prior arts having the operations, the methods, the other steps in the flows, the measures, the schemes discussed in the invention can also be replaced, changed, rearranged, combined or deleted.

The descriptions hereinabove are only part of embodiments of this invention. It should be pointed out that to a person skilled in the art, under the circumstance without deviating from the principle of the present invention, he can also make several improvements and modifications, where these improvements and modifications should also be deemed falling within the protection scope of the present invention.

The invention claimed is:

1. A method for reporting channel state information (CSI) by a user equipment (UE), the method comprising:
   receiving configuration information on CSI-reference signal resources;
   receiving control information including a CSI-RS resource indicator; and
   measuring channel state based on the CSI-RS resource indicator and the configuration information.

2. The method of claim 1, wherein the configuration information is received on a higher layer.

3. The method of claim 1, wherein the configuration information includes information on CSI-RSs with respect to a vertical antenna and information on CSI-RSs with respect to a horizontal antenna,
   wherein the information on CSI-RSs with respect to a vertical antenna and the information on CSI-RSs with respect to a horizontal antenna are independent of each other.

4. The method of claim 1, wherein the CSI-RS resource indicator includes a predetermined number of bits.

5. The method of claim 1, wherein receiving the control information comprises receiving the CSI-RS resource indicator on a physical downlink control channel (PDCCH), the CSI-RS resource indicator being used for indicating whether CSI-RSs in a physical resource block (PRB) of a physical downlink shared channel (PDSCH) exist.

6. A method for receiving channel state information (CSI) by a base station, the method comprising:
   transmitting configuration information on CSI-reference signal (RS) resources;
   transmitting control information including a CSI-RS resource indicator; and
   receiving a channel state measured based on the CSI-RS resource indicator and the configuration information.

7. The method of claim 6, wherein the configuration information is transmitted on a higher layer.

8. The method of claim 6, wherein the configuration information includes on information with respect to a vertical antenna and information on CSI-RSs with respect to a horizontal antenna, and
   wherein the information on CSI-RSs with respect to a vertical antenna and the information on CSI-RSs with respect to a horizontal antenna are independent of each other.

9. The method of claim 6, wherein the CSI-RS resource indicator includes a predetermined number of bits.

10. The method of claim 6, wherein transmitting the control information comprises transmitting the CSI-RS resource indicator on a physical downlink control channel (PDCCH), the CSI-RS resource indicator being used for indicating whether CSI-RSs in a physical resource block (PRB) of a physical downlink shared channel (PDSCH) exist.

11. A user equipment (UE) for reporting channel state information (CSI), comprising:
    a transceiver; and
    a controller configured to:
    receive configuration information on CSI-reference signal (RS) resources,
    receive control information including a CSI-RS resource indicator; and
    measure a channel state based on the CSI-RS resource indicator and the configuration information.

12. The UE of claim 11, wherein the configuration information is received on a higher layer.

13. The UE of claim 11, wherein the configuration information includes information on CSI-RSs with respect to a vertical antenna and information on CSI-RSs with respect to a horizontal antenna, and
    wherein the information on CSI-RSs with respect to a vertical antenna and the information on CSI-RSs with respect to a horizontal antenna are independent of each other.

14. The UE of claim 11, wherein the CSI-RS resource indicator includes a predetermined number of bits.

15. The UE of claim 11, wherein the controller is configured to receive the CSI-RS resource indicator on a physical downlink control channel (PDCCH), the CSI-RS resource indicator being used for indicating whether CSI-RSs in a physical resource block (PRB) of a physical downlink shared channel (PDSCH) exist.

16. A base station for receiving channel state information (CSI), the base station comprising:
    a transceiver; and
    a controller configured to:
    transmit configuration information on CSI-reference signal (RS) resources;

transmit control information including a CSI-RS resource indicator; and receive a channel state measured based on the CSI-RS resource indicator and the configuration information.

17. The base station of claim 16, wherein the configuration information is transmitted on a higher-layer.

18. The base station of claim 16, wherein the configuration information includes information on CSI-RSs with respect to a vertical antenna and information on CSI-RSs with respect to a horizontal antenna, and wherein the information on CSI-RSs with respect to a vertical antenna and the information on CSI-RSs with respect to a horizontal antenna are independent of each other.

19. The base station of claim 16, wherein the CSI-RS resource indicator includes a predetermined number of bits.

20. The base station of claim 16, wherein the controller is further configured to transmit the CSI-RS resource indicator on a physical downlink control channel (PDCCH), the CSI-RS resource indicator being used for indicating whether CSI-RSs in a physical resource block (PRB) of a physical downlink shared channel (PDSCH) exist.

* * * * *